(12) United States Patent
Sutardja et al.

(10) Patent No.: US 8,374,004 B2
(45) Date of Patent: Feb. 12, 2013

(54) ISOLATED AC-DC CONVERTER WITH MASTER CONTROLLER ON SECONDARY SIDE AND SLAVE CONTROLLER ON PRIMARY SIDE

(75) Inventors: Sehat Sutardja, Los Altos Hills, CA (US); Ravishanker Krishnamoorthy, Singapore (SG); Wanfeng Zhang, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 318 days.

(21) Appl. No.: 12/814,957

(22) Filed: Jun. 14, 2010

(65) Prior Publication Data

US 2011/0038184 A1 Feb. 17, 2011

Related U.S. Application Data

(60) Provisional application No. 61/234,187, filed on Aug. 14, 2009, provisional application No. 61/235,121, filed on Aug. 19, 2009.

(51) Int. Cl.
*H02M 3/335* (2006.01)

(52) U.S. Cl. ............... 363/21.12; 363/21.15; 363/21.16; 363/21.17; 363/97; 363/131

(58) Field of Classification Search ............... 363/21.12, 363/21.15, 21.16, 21.17, 97, 131
See application file for complete search history.

(56) References Cited

U.S. PATENT DOCUMENTS

| | | | | |
|---|---|---|---|---|
| 5,745,358 A | * | 4/1998 | Faulk | 363/95 |
| 5,745,359 A | * | 4/1998 | Faulk | 363/95 |
| 5,764,495 A | * | 6/1998 | Faulk | 363/21.13 |
| 5,768,118 A | * | 6/1998 | Faulk et al. | 363/72 |
| 5,841,641 A | * | 11/1998 | Faulk | 363/21.14 |
| 6,952,355 B2 | * | 10/2005 | Riggio et al. | 363/21.15 |
| 7,375,994 B2 | | 5/2008 | Andreycak | |
| 2002/0122320 A1 | | 9/2002 | Brkovic | |
| 2004/0160794 A1 | | 8/2004 | Lin | |

FOREIGN PATENT DOCUMENTS

| | | |
|---|---|---|
| WO | WO 2009/004847 | 1/2009 |
| WO | WO 2009/011374 | 1/2009 |

OTHER PUBLICATIONS

European Search Report from the European Patent Office dated Dec. 13, 2010 for European Application No. 10172392.2; 10 pages.
AN-8025—Design Guideline of Single-Stage Flyback AC-DC Converter Using FAN7530 for LED Lighting; Fairchild Semiconductor Corporation; Jul. 29, 2009; 9 pages.
Rectifier; Wikipedia, the free encyclopedia; http://en.wikipedia.org/wiki/Rectifier; Oct. 6, 2009; 8 pages.
DC to DC Converter; Wikipedia, the free encyclopedia; http://en.wikipedia.org/wiki/DC_to_DC_converter; Oct. 6, 2009; 6 pages.
Flyback Converter; Wikipedia, the free encyclopedia; http://en.wikipedia.org/wiki/Flyback_converter; Oct. 6, 2009; 3 pages.

* cited by examiner

*Primary Examiner* — Bao Q Vu

(57) ABSTRACT

An isolated alternating current (AC)-direct current (DC) converter is disclosed. The isolated AC-DC converter comprises a slave control circuit including a slave driver module configured to receive a command and to control coupling of the slave control circuit to a primary-side inductor of a transformer based on the command, a master control circuit coupled to a secondary-side inductor of the transformer, the master control circuit including a master control module configured to sense a feedback voltage across a load and to generate the command based on the feedback voltage and a reference voltage, and a coupler configured to communicate the command from the master control module to the slave driver module and to provide isolation between the master control module and the slave driver module.

18 Claims, 8 Drawing Sheets

US 8,374,004 B2

ISOLATED AC-DC CONVERTER WITH MASTER CONTROLLER ON SECONDARY SIDE AND SLAVE CONTROLLER ON PRIMARY SIDE

CROSS-REFERENCE TO RELATED APPLICATIONS

This application claims the benefit of U.S. Provisional Application No. 61/234,187 filed on Aug. 14, 2009 and U.S. Provisional Application No. 61/235,121 filed on Aug. 19, 2009. The disclosures of the above applications are incorporated herein by reference in its entirety.

FIELD

The present disclosure relates to control systems and methods for isolated AC-DC converters.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A primary function of power supplies such as isolated AC-DC converters is to convert an AC signal from an AC signal source into a DC signal. The DC signal may be used to power a load. Another function of the isolated AC-DC converter is to provide isolation between the AC signal source and the load to prevent shock. The isolated AC-DC converter may also be designed to prevent damage to the AC-DC converter and the load due to high operating temperatures, short circuits, and other faults.

Control systems for isolated AC-DC converters typically include a transformer to provide isolation between the AC signal source and the load. A master control circuit is located on a primary side of the transformer. The primary side of the transformer is also directly connected to the AC signal source. The master control circuit provides a voltage control loop and a current control loop. The master control circuit may also provide protection functions such as monitoring of temperature, voltage and current limits.

An auxiliary control circuit is located on a secondary side of the transformer. The secondary side is directly connected to the load. The voltage control loop adjusts operation of the AC-DC converter such that a feedback voltage $V_{fb}$ follows a reference voltage $V_{ref}$. The current control loop adjusts operation of the AC-DC converter such that a feedback current $I_{fb}$ follows a reference current $I_{ref}$. The current feedback loop may also be based in part on the feedback voltage $V_{fb}$.

The feedback voltage $V_{fb}$ is sensed on the secondary side of the AC-DC converter. The feedback voltage $V_{fb}$ is fed back from the secondary side to the primary side through a coupler that provides isolation. The coupler may be an optical coupler or magnetic coupler.

Referring now to FIG. 1, an exemplary AC-DC converter 10 includes a primary side 12 and a secondary side 14. The primary side 12 includes an AC signal source 16 and a rectifier 18. For example, the rectifier 18 may be a full wave rectifier that includes diodes D1-D4 arranged as shown. An output of the rectifier 18 connects to a transformer 28 having a primary-side inductor 30 with $N_p$ turns and a secondary side inductor 32 with $N_s$ turns.

The isolated AC-DC converter 10 is configured in a flyback converter topology. The transformer 28 is connected to a diode 34 arranged between one end of the secondary side inductor 32 and an output capacitor 36. The output capacitor 36 is connected across a load 40.

A control circuit 50 is located on and directly connected to the primary side 12 and includes a transistor 54 and a control module 56. The transistor 54 has a first terminal that connects to one end of the primary-side inductor 30. The transistor 54 selectively connects the primary-side inductor 30 to a reference potential such as ground. The number of turns on the primary side 12 (or $N_p$) relative to the number of turns on the secondary side 14 (or $N_s$) is determined based on the ratio of the output voltage to the input voltage range.

The control module 56 receives a feedback voltage $V_{fb}$ that is sensed on the secondary side 14 and that is output to the control module 56 via a coupler 60. The coupler 60 typically includes an optical coupler or a magnetic coupler.

The secondary side 14 may include a voltage divider including first and second resistors $R_1$ and $R_2$. The feedback voltage $V_{fb}$ may be generated at a node between the resistors $R_1$ and $R_2$ and is fed back to the control module 56 via the coupler 60. A feedback current $I_{fb}$ may be sensed by the control module 56 at a node A, which is connected to a resistor $R_s$ and a terminal of the transistor 54. The control module 56 controls switching of the transistor 54 (via a control terminal of the transistor 54) to adjust the current and voltage supplied to the load 40.

When the transistor 54 is ON, magnetic flux increases in the transformer 28. A voltage across the secondary side inductor 32 is typically negative and therefore the diode 34 is reverse biased. Energy stored in the capacitor 36 flows to the load 40. When the transistor 54 is OFF, the diode 34 is forward biased and energy flows from the transformer 28 to the load 40 and the capacitor 36.

Some applications may require additional monitoring and control to be performed by the load 40. In these situations, the load 40 may need to send and receive additional control parameters and receive sensed parameters from the control module 56. To provide the additional information to the load 40 in the implementation of FIG. 1, additional isolation components are required for each additional signal that needs to be provided from the control module 56 to the load 40. The additional components needed to isolate these signals tend to significantly increase the overall size and cost of the electronic device.

SUMMARY

An isolated alternating current (AC)-direct current (DC) converter comprises a slave control circuit including a slave driver module configured to receive a command and to control coupling of the slave control circuit to a primary-side inductor of a transformer based on the command, a master control circuit coupled to a secondary-side inductor of the transformer, the master control circuit including a master control module configured to sense a feedback voltage across a load and to generate the command based on the feedback voltage and a reference voltage, and a coupler configured to communicate the command from the master control module to the slave driver module and to provide isolation between the master control module and the slave driver module.

In other features, the isolated AC-DC converter is configured in a flyback converter topology. In this topology, the isolated AC-DC converter further comprises a diode connected between one end of the secondary-side inductor and the load, and a capacitor having one end connected between the diode and the load and an opposite end connected to another end of the secondary-side inductor.

In other features, the slave control circuit further includes a transistor configured to connect one of between an AC signal source and a rectifier and between the rectifier and the transformer, and a startup control module configured to control switching of the transistor to selectively provide a supply voltage during startup.

In other features, the isolated AC-DC converter further comprises a switch disposed between the secondary-side inductor and a capacitor. The switch is controlled by the master control circuit. The master control module is configured to monitor a feedback current and to control the switch based on the feedback current and a reference current. The master control module includes a protection circuit that monitors at least one of a temperature of the isolated AC-DC converter, an over-voltage condition, an over-current condition, and a short circuit condition.

In other features, the isolated AC-DC converter is configured in a forward converter topology. In this topology, the isolated AC-DC converter further comprises a first switch having a first end connected to the secondary-side inductor, a second switch having a first end connected to a second end of the first switch, an inductor having a first end connected to the second end of the first switch and a second end connected to the load, and a capacitor having a first end connected between the inductor and the load. Alternatively, the isolated AC-DC converter further comprises a first switch having a first end connected to the secondary-side inductor, a second switch having a first end connected to a second end of the first switch, an inductor having a first end connected to a second end of the second switch and a second end connected to the load, and a capacitor having a first end connected between the inductor and the load.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
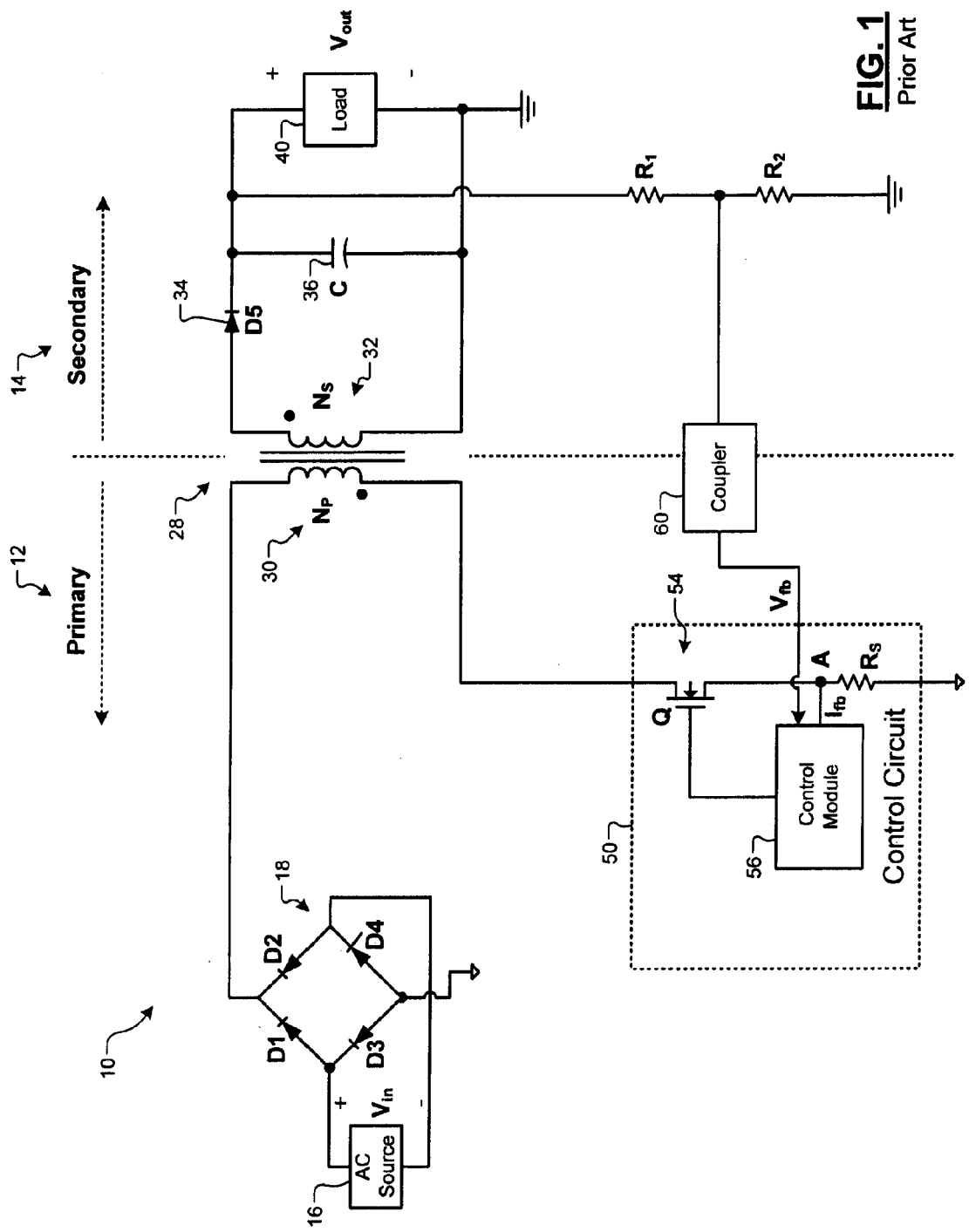
FIG. 1 is a functional block diagram of an isolated AC-DC converter according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

An isolated AC-DC converter according to the present disclosure operates using a master control circuit that is located on and directly connected to a secondary side of a transformer (instead of on a primary side as in FIG. 1). The master control circuit includes a voltage control loop and a current control loop. A slave control circuit is located on and directly connected to the primary side and performs startup, driver and/or protection functions as will be further described below.

Locating the master control circuit on the secondary side has several advantages. Using this approach allows communication between the master control circuit and the load without the need for isolating couplers between the master control circuit and the load. As a result, this approach tends to be more cost effective for next generation power supplies that are more closely integrated with the load, controlled by the load and/or communicate with the load.

Figure 2A:
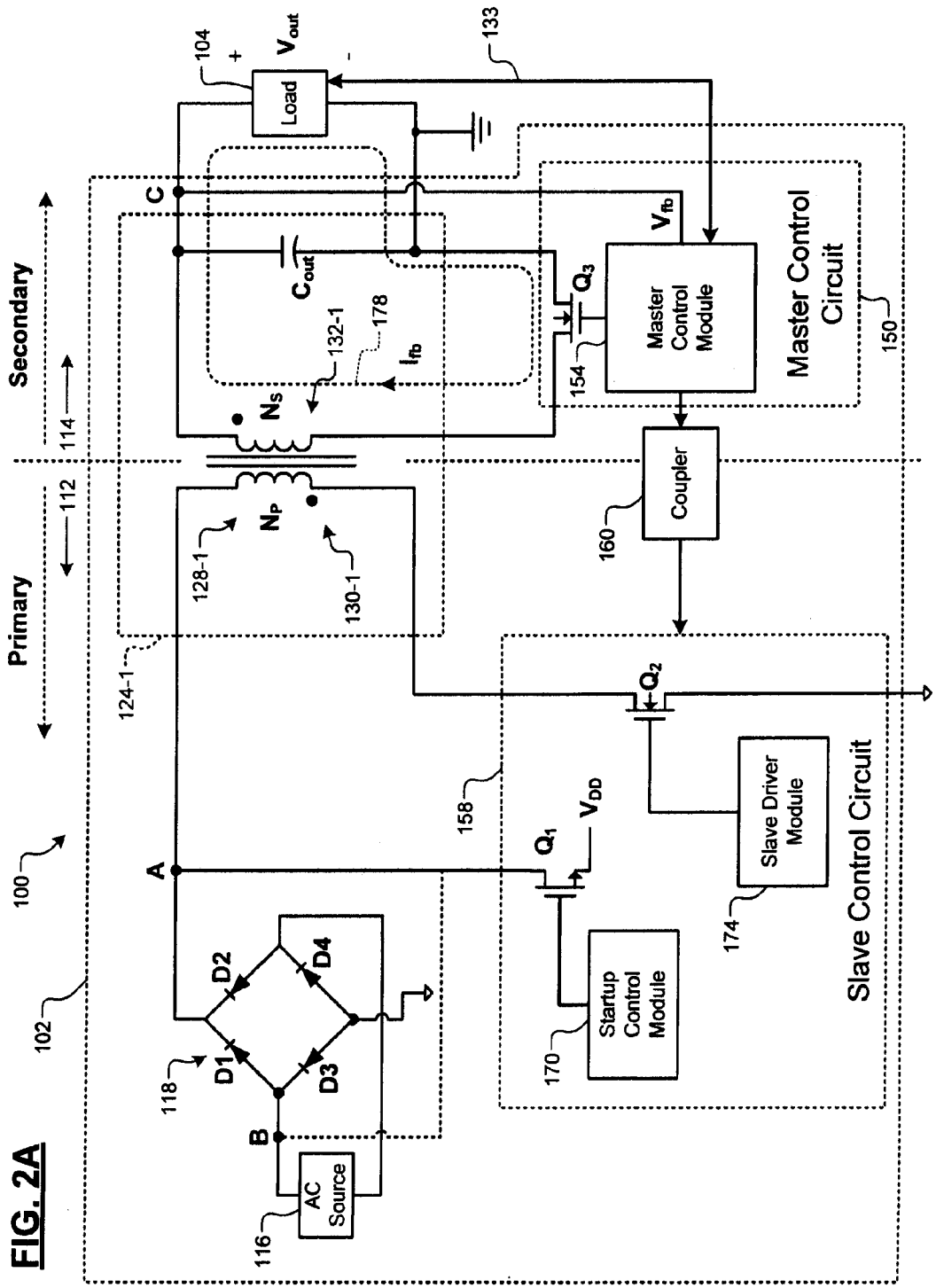
FIG. 2A is a functional block diagram of an exemplary isolated AC-DC converter with a flyback converter topology according to the present disclosure.

Referring now to FIG. 2A, an exemplary system 100 includes an isolated AC-DC converter 102 and a load 104. The isolated AC-DC converter 102 has a primary side 112 and a secondary side 114. The primary side 112 includes an AC signal source 116 and a rectifier 118. For example, the rectifier 118 may be a full-wave rectifier or a half-wave rectifier.

Figure 2B:
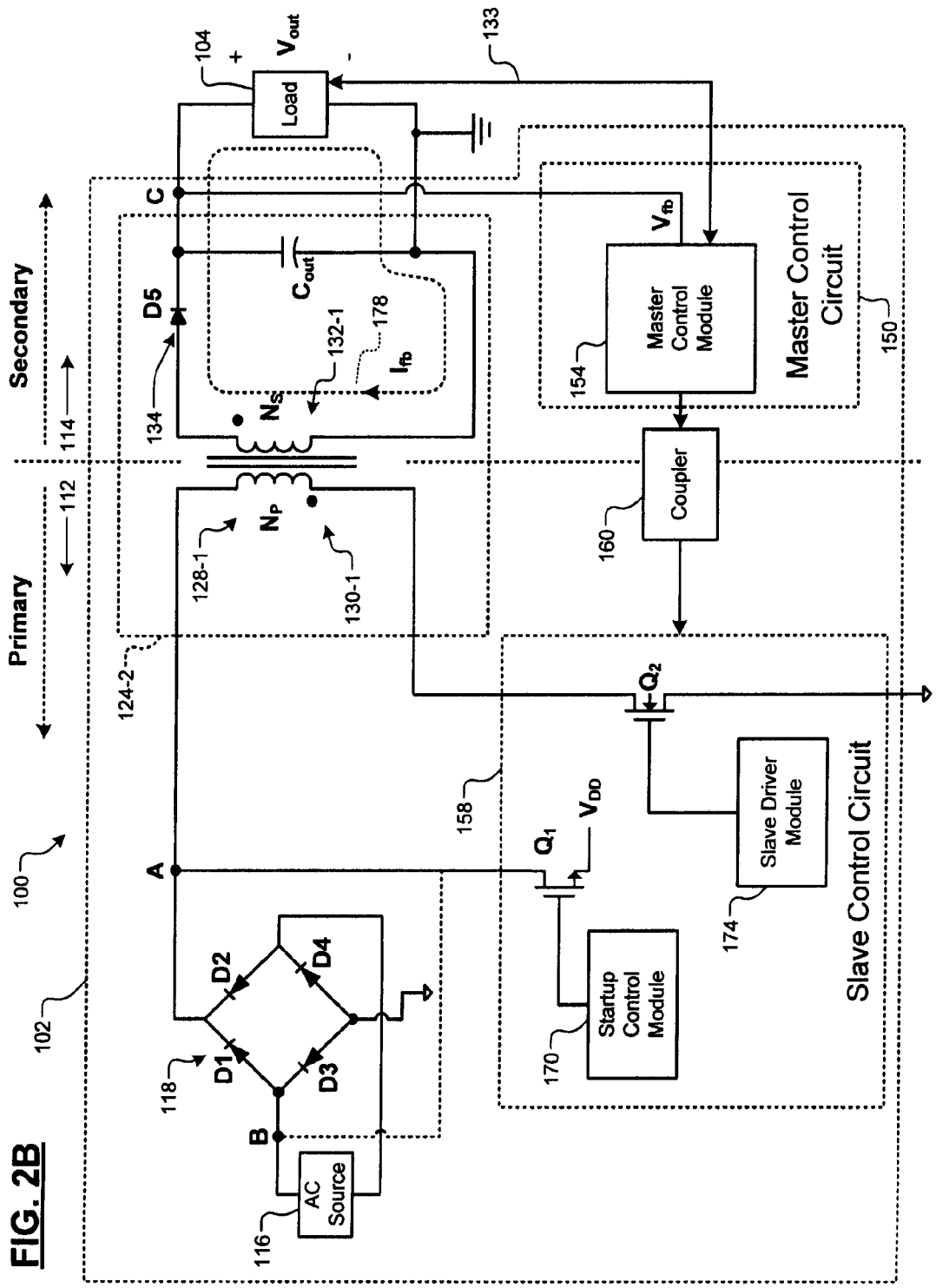
FIG. 2B is a functional block diagram of another exemplary isolated AC-DC converter with a flyback converter topology according to the present disclosure.
Figure 4A:
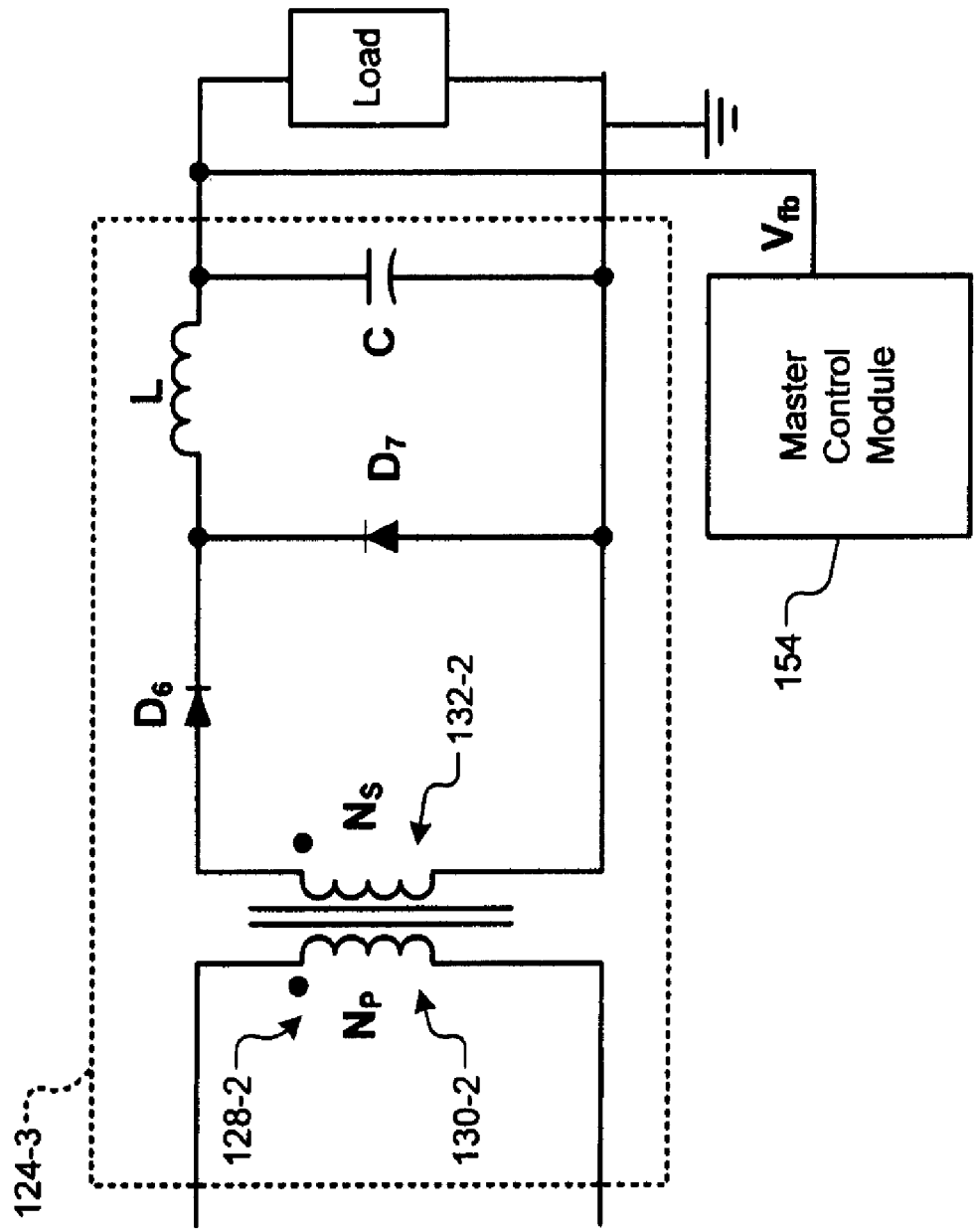
FIG. 4A illustrates a forward converter topology according to the present disclosure.
Figure 4B:
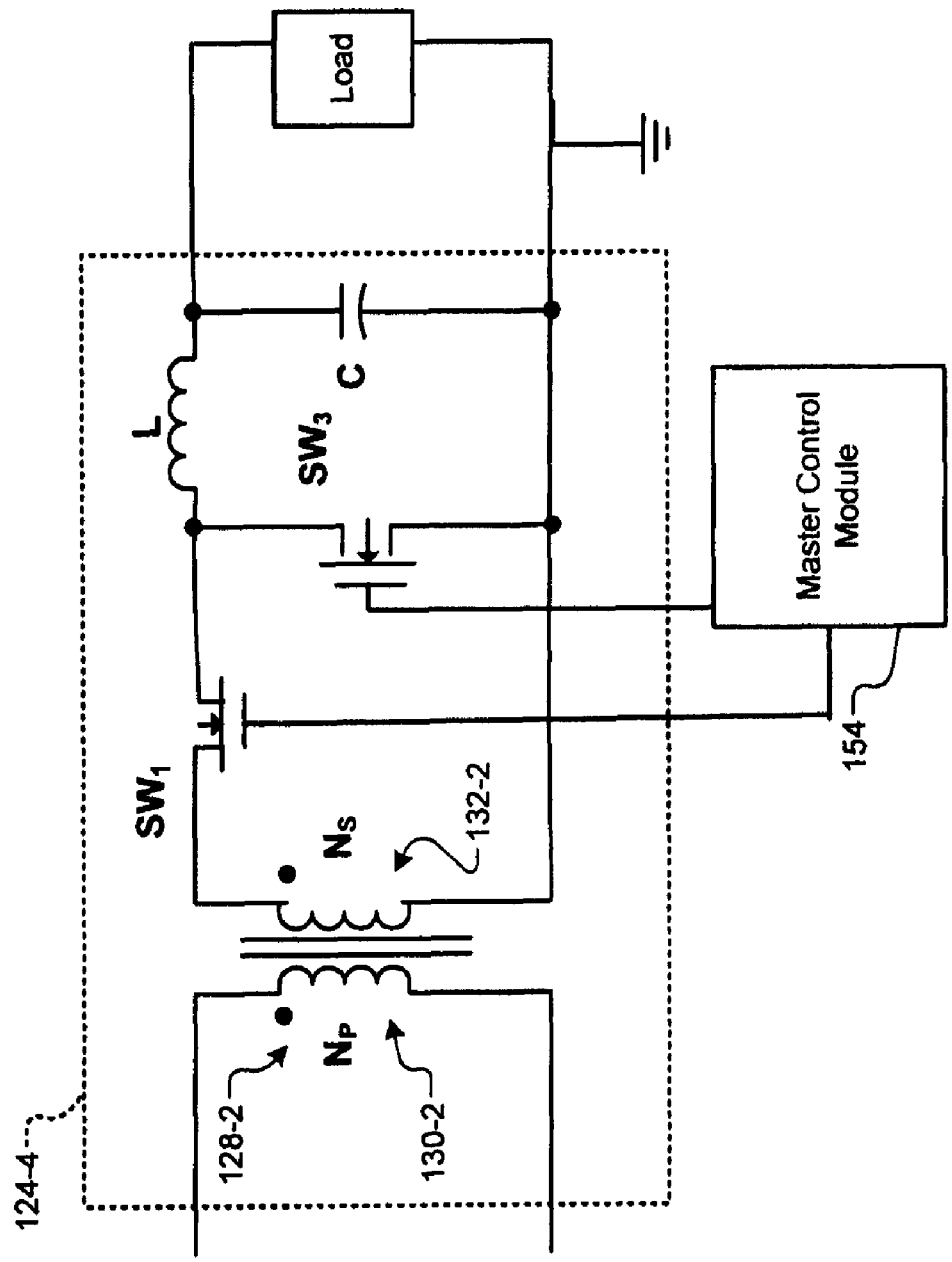
FIG. 4B illustrates another forward converter topology according to the present disclosure.

The isolated AC-DC converter 102 may have flyback converter topologies 124-1 and 124-2 as shown in FIGS. 2A and 2B, forward converter topologies 124-3 and 124-4 as shown in FIGS. 4A and 4B or any other suitable isolated AC-DC converter topology. In FIG. 2A, an output of the rectifier 118 communicates with a transformer 128-1 having a primary-side inductor 130-1 and a secondary side inductor 132-1. An output capacitor $C_{out}$ is connected across the load 104.

The load 104 may be an electronic device requiring a DC supply such as a consumer electronic device, a laptop, a set-top box, a cellular phone, or any other suitable electronic device. In some implementations, the load 104 interfaces with the isolated AC-DC converter 102 by exchanging commands, status information and/or sensed parameters via one or more direct connections 133 that are non-isolated connections. In other words, the direct connections do not require couplers to provide isolation since the master control module is arranged on the secondary side 114.

A master control circuit 150 is located on and directly connected to the secondary side 114 and includes a transistor $Q_3$ and a master control module 154. A slave control circuit 158 is located on and directly connected to the primary side 112. The slave control circuit 158 is controlled by the master control circuit 150 and receives driver commands for driving a transistor $Q_2$ from the master control module 154 via a coupler 160. For example only, the coupler 160 may include an optical coupler or a magnetic coupler.

The slave control circuit 158 includes a first transistor $Q_1$ and a startup control module 170. The startup control module 170 selectively connects supply voltage $V_{DD}$ to node A via a control terminal of the transistor $Q_1$ during startup. Node A is located between the rectifier 118 and the transformer 128-1. Alternately, the startup control module 170 may connect the supply voltage $V_{DD}$ to node B. Node B is located between the AC source 116 and the rectifier 118.

The slave control circuit 158 further includes a slave driver module 174 that includes a second transistor $Q_2$. The slave driver module 174 drives a control terminal of the transistor $Q_2$ based on a command from the master control module 154. The second transistor $Q_2$ has a first terminal that connects to one end of a primary-side inductor 130-1 of the transformer 128-1. A second terminal of the transistor $Q_2$ connects to a reference potential such as ground.

A feedback current $I_{fb}$ flowing in a current loop 178 may be sensed by the master control module 154. A feedback voltage $V_{fb}$ may be sensed at node C. The master control module 154 sends a command to the slave driver module 174 to control switching of the transistor $Q_2$ (via a control terminal of the transistor $Q_2$) to adjust the current and voltage supplied to the load 40.

The isolated AC-DC converter 102 is configured to operate in continuous conduction mode and/or discontinuous conduction mode. The transistors $Q_1$, $Q_2$ and $Q_3$ can be metal oxide semiconductor field effect transistors (MOSFETs). The transistors $Q_1$, $Q_2$ and $Q_3$ can be high-voltage voltage devices including, for example, ultra high voltage (UHV) transistors that can withstand over 100V DC. One or more of the transistors $Q_1/Q_2$ and $Q_3$ may include a body diode. Transistors $Q_1$, $Q_2$ and $Q_3$ essentially perform switching/coupling functions. Based on the disclosure and teachings provided herein, it should be understood that other electronic components may be used to effect the switching/coupling functions performed by transistors $Q_1/Q_2$ and $Q_3$.

In FIG. 2B, another flyback converter topology 124-2 is shown. The transformer 128-1 is connected to a diode $D_5$ 134 arranged between one end of the secondary-side inductor 132-1 and one end of the output capacitor $C_{out}$. In this topology, the other end of the secondary-side inductor 132-1 is coupled directly to the other end of the output capacitor $C_{out}$; in other words, transistor $Q_3$ is not used. The diode $D_5$ 134 functions as a switch. Based on the disclosure and teachings provided herein, it should be understood that other electronic components may be used to perform the switching function.

Figure 3:
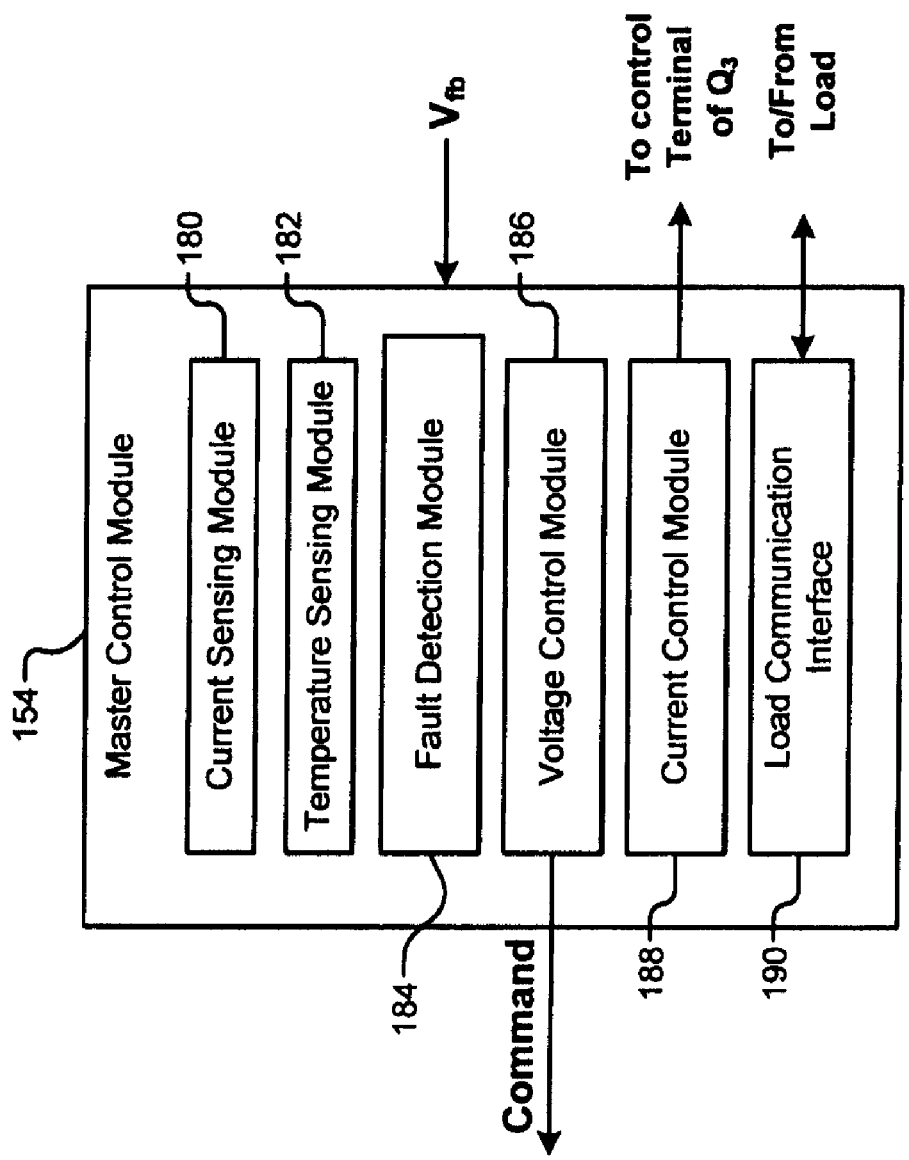
FIG. 3 is a functional block diagram of an exemplary master control module according to the present disclosure.

Referring now to FIG. 3, an exemplary master control module 154 is shown. The master control module 154 may perform a variety of monitor and control functions in addition to the voltage and current control loops described above. The master control module 154 includes a current sensing module 180 that senses feedback current $I_{fb}$ flowing through the transistor $Q_3$.

A temperature sensing module 182 senses a temperature of the power supply. The temperature sensing module 182 may be implemented using any suitable approach. For example only, the temperature sensing module 182 may include a sensor that generates a voltage or current signal related to a temperature of the power supply. The voltage or current signal may be converted to a temperature value. Alternately, the voltage or current signal may be input to a comparator, which compares the signal to a predetermined temperature or reference signal. When the signal exceeds the reference signal, a high temperature event may be declared.

A fault detection module 184 senses various conditions such as a short circuit condition, an over-voltage condition and/or an over-current condition. A voltage control module 186 generates and outputs the command for the slave driver module 174 based upon the feedback voltage $V_{fb}$ and a reference voltage $V_{ref}$. A current control module 188 generates a control signal for a control terminal of the transistor $Q_3$ based upon the feedback current $I_{fb}$, a reference current $I_{ref}$ and/or the feedback voltage $V_{th}$.

One or more load communication interfaces 190 transmit and/or receive data to/from the load 104. For example only, the one or more load communication interfaces 190 may receive commands from the load 104 to shut down and/or reduce power. For example only, the one or more load communication interfaces 190 may transmit sensed parameters such as the feedback voltage $V_{fb}$, the feedback current $I_{fb}$, the temperature, the over-voltage condition, the short circuit condition, the reference voltage $V_{ref}$, the reference current $I_{ref}$, and/or any other sensed parameters to the load 104.

Referring now to FIG. 4A, the isolated AC-DC converter 102 may be implemented with any other suitable isolated AC/DC converter topologies. For example only, a forward converter topology 124-3 is shown in FIG. 4A. The forward converter topology 124-3 includes a transformer 128-2 with primary-side and secondary-side inductors 130-2 and 132-2, respectively. The forward converter topology 124-3 further includes diodes $D_6$ and $D_7$, an inductor L, and a capacitor C coupled as shown in FIG. 4A. Diodes $D_6$ and $D_7$ function as switches and cooperate with transistor $Q_2$ to generate and provide power from the transformer 128-2 to the load 104. When transistor $Q_2$ is on, current flows through the primary inductor 130-2 which in turn results in current flowing in a loop defined by diode $D_6$, inductor L, the load and the secondary-side inductor 132-2. When transistor $Q_2$ is off, current stops flowing through the primary inductor 130-2 and the secondary-side inductor 132-2; current, however, still flows through a loop defined by diode $D_7$, inductor L and capacitor C.

FIG. 4B illustrates another forward converter topology 124-4. In this topology, switches $SW_1$ and $SW_3$ are used in lieu of diodes $D_6$ and $D_7$ (as shown in FIG. 4A). Switches $SW_1$ and $SW_3$, however, perform functions that are similar to those of diodes $D_6$ and $D_7$. Switches $SW_1$ and $SW_3$ may include, for example, MOSFET transistors. Since switch $SW_1$ is not coupled to a ground potential, switch $SW_1$ is implemented as a high-voltage device; switch $SW_3$, on the other hand, may be implemented as a low-voltage device. In contrast to diodes $D_6$ and $D_7$, switches $SW_1$ and $SW_3$ are coupled to and controlled by the master control module 154.

Figure 4C:
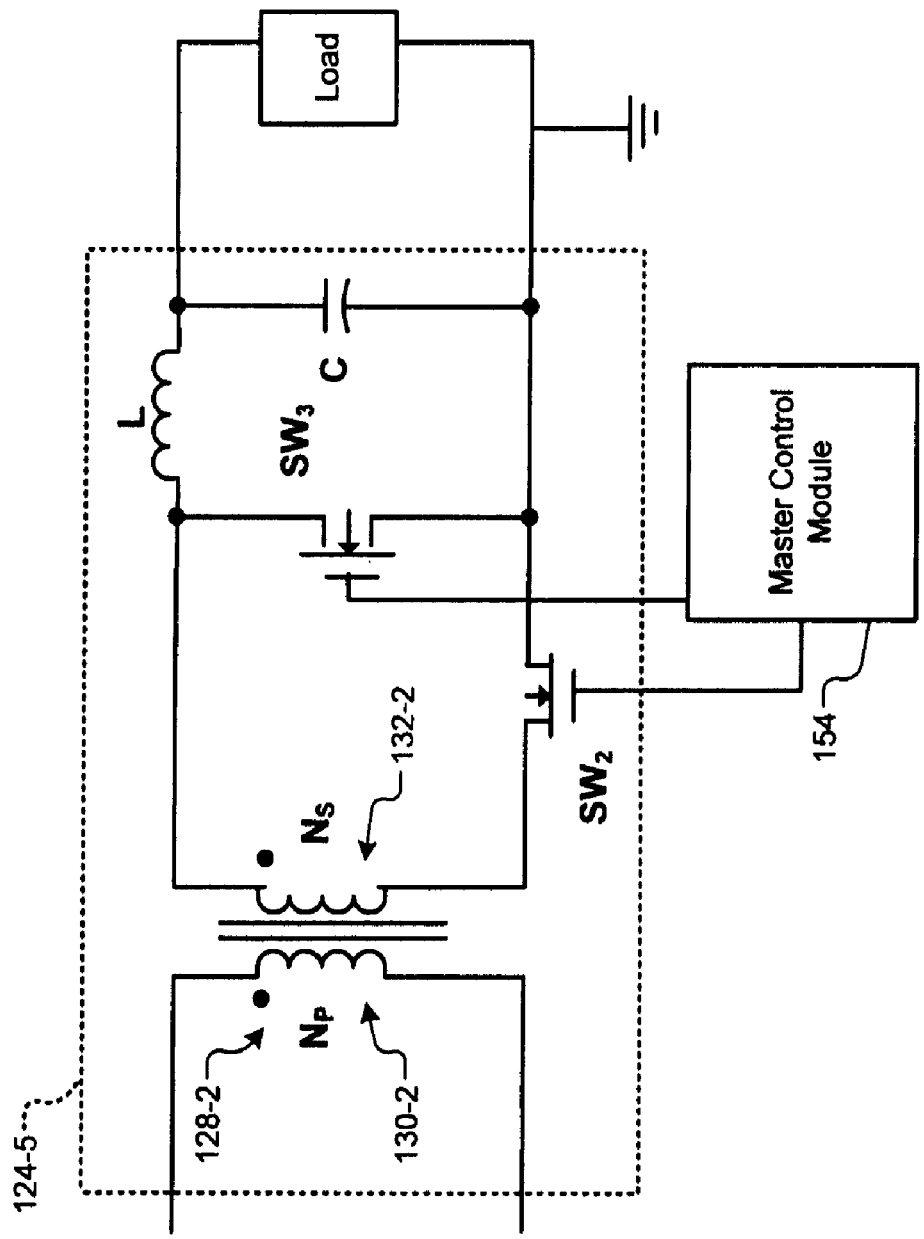
FIG. 4C illustrates yet another forward converter topology according to the present disclosure.

FIG. 4C further illustrates another forward converter topology 124-5. In this topology, switch $SW_2$ is disposed between one end of the secondary-side inductor 132-2 in the transformer 128-2 and one end of the capacitor C. Switch $SW_2$ may include, for example, a MOSFET transistor. Since switches $SW_2$ and $SW_3$ are both coupled to a ground potential, switches $SW_2$ and $SW_3$ may be implemented as low-voltage devices. Similarly, switches $SW_2$ and $SW_3$ are coupled to and controlled by the master control module 154.

Figure 5:
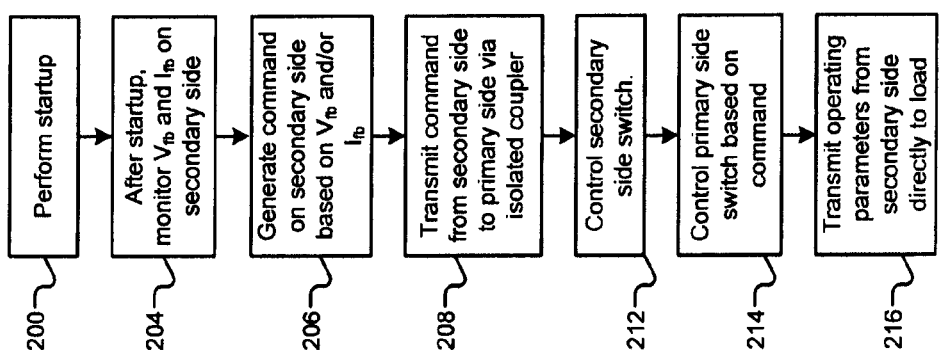
FIG. 5 illustrates a method for operating the isolated AC-DC converter according to the present disclosure.

Referring now to FIG. 5, a method for operating an isolated AC-DC converter as shown in FIG. 2A according to the present disclosure is disclosed. At 200, the power supply is started using the startup control module 170. More particularly, the startup control module 170 supplies $V_{DD}$ to enable the slave driver module 174 to start.

After startup at 204, the master control module 154 monitors the feedback voltage $V_{fb}$ and/or feedback current $I_{fb}$ on the secondary side 114. At 206, the master control module 154 generates the command for the slave driver module 174 based on the feedback voltage $V_{fb}$ and/or feedback current $I_{fb}$. The startup control module 170 stops supplying $V_{DD}$ after startup.

At 208, the master control module 154 transmits the command from the secondary side 114 to the primary side 112 via the coupler 160. At 212, the master control module 154 controls the transistor $Q_3$. As can be appreciated, the transistor $Q_3$ may be operated to provide continuous and discontinuous modes. In the continuous mode, current fluctuates during a cycle but does not go to zero. In the discontinuous mode, current fluctuates during a cycle and goes to zero at or before the end of the cycle.

At 214, the slave driver module 174 controls the primary-side transistor $Q_2$ based upon the command. At 216, operating parameters may be transmitted by the master control module 154 directly to the load 104. In addition, commands may be received by the master control module 154 directly from the load 104.

Figure 6:
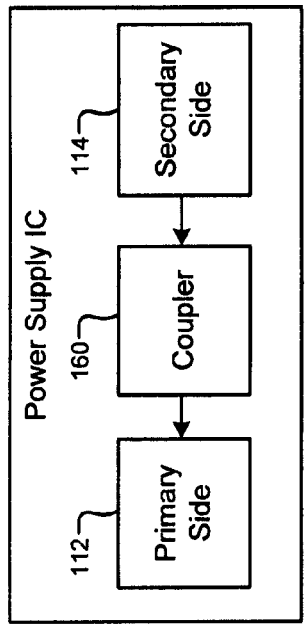
FIG. 6 illustrates a power supply integrated circuit according to the present disclosure.

The primary and secondary sides of the power supply may be implemented using discrete circuits and/or one or more integrated circuits (ICs). For example and referring now to FIG. 6, the primary side 112 and secondary side 114 may be implemented by a single IC. In this implementation, the coupler is an inductive coupler that is implemented on-chip.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An isolated alternating current (AC)-direct current (DC) converter, comprising:
   a slave control circuit that includes:
      a first transistor configured to connect to a primary side inductor of a transformer; and
      a slave driver module configured to, based on receiving a command, control switching of the first transistor;
   a master control circuit that includes:
      a first diode having an input connected to a first end of a secondary side inductor of the transformer;
      a capacitor having a first end and a second end, wherein the first end of the capacitor is connected to (i) an output of the first diode and (ii) a load, and wherein the second end of the capacitor is connected to a second end of the secondary side inductor; and
      a master control module configured to sense a feedback voltage across the load, and generate the command based on (i) the feedback voltage and (ii) a reference voltage; and
   a coupler configured to communicate the command from the master control module to the slave driver module, and provide isolation between the master control module and the slave driver module.

2. The isolated AC-DC converter of claim 1, wherein the isolated AC-DC converter is configured in a flyback converter topology.

3. The isolated AC-DC converter of claim 1, wherein the master control module is configured to transmit at least one of sensed parameters and the command to the load via a non-isolated connection to the load.

4. The isolated AC-DC converter of claim 1, wherein the slave control circuit further includes:
   a second transistor configured to connect one of between an AC signal source and a rectifier and between the rectifier and the transformer; and
   a startup control module configured to control switching of the second transistor to selectively provide a supply voltage during startup.

5. The isolated AC-DC converter of claim 1, wherein the isolated AC-DC converter is configured in a forward converter topology.

6. The isolated AC-DC converter of claim 5, further comprising:
   a second diode having an output connected to the output of the first diode; and
   an inductor having a first end and a second end, wherein the first end of the inductor is connected to the output of the first diode, and wherein the second end of the inductor is connected to the load.

7. The isolated AC-DC converter of claim 1, wherein the first transistor is an ultra high voltage (UHV) transistor.

8. The isolated AC-DC converter of claim 1, wherein the master control module includes a protection circuit that monitors at least one of a temperature of the isolated AC-DC converter, an over-voltage condition, an over-current condition, and a short circuit condition.

9. The isolated AC-DC converter of claim 1, wherein the master control module is configured to monitor a feedback current.

10. The isolated AC-DC converter of claim 1, wherein the slave control circuit, the master control circuit, and the coupler are implemented on a single integrated circuit.

11. The isolated AC-DC converter of claim 1, wherein the coupler is selected from a group including an optical coupler and a magnetic coupler.

12. The isolated AC-DC converter of claim 1, wherein the master control module is configured to receive at least one of sensed parameters and a control command from the load via a non-isolated connection to the load.

13. A method of operating an isolated alternating current (AC)-direct current (DC) converter, the method comprising:
   receiving a command at a slave driver module of a slave control circuit, wherein a first transistor of the slave control circuit is connected to a primary side inductor of a transformer;
   controlling switching of the first transistor based on the slave driver module receiving the command;
   providing a first diode of a master control circuit, the first diode having an input connected to a first end of a secondary side inductor of the transformer;
   providing a capacitor having a first end connected to (i) an output of the first diode and (ii) a load, and a second end connected to a second end of the secondary side inductor; and
   sensing a feedback voltage across the load,
   wherein the command received by the slave driver module is generated based on (i) the feedback voltage and (ii) a reference voltage.

14. The method of claim 13, further comprising transmitting at least one of sensed parameters and the command to the load via a non-isolated connection to the load.

15. The method of claim 13, further comprising:
   controlling switching of a second transistor of the slave control circuit to selectively provide a supply voltage during startup, wherein the second transistor is connected one of between an AC signal source and a rectifier and between the rectifier and the transformer.

16. The method of claim 13, further comprising monitoring at least one of 6 temperature of the isolated AC-DC converter, an over-voltage condition, an over-current condition, and a short circuit condition.

17. The method of claim 13, further comprising:
   monitoring a feedback current.

18. The method of claim 13, further comprising receiving at least one of sensed parameters and a control command from the load via a non-isolated connection to the load.

* * * * *